June 20, 1967 P. S. REED 3,326,398
BOAT LOADER FOR TRAILERS
Filed Sept. 28, 1965 4 Sheets-Sheet 1
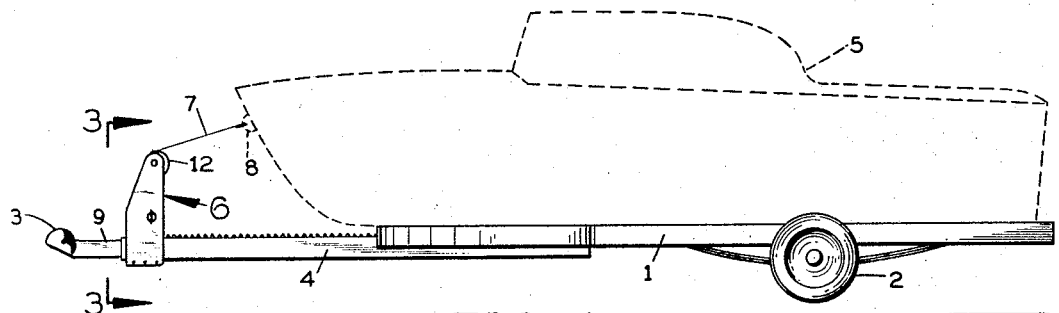
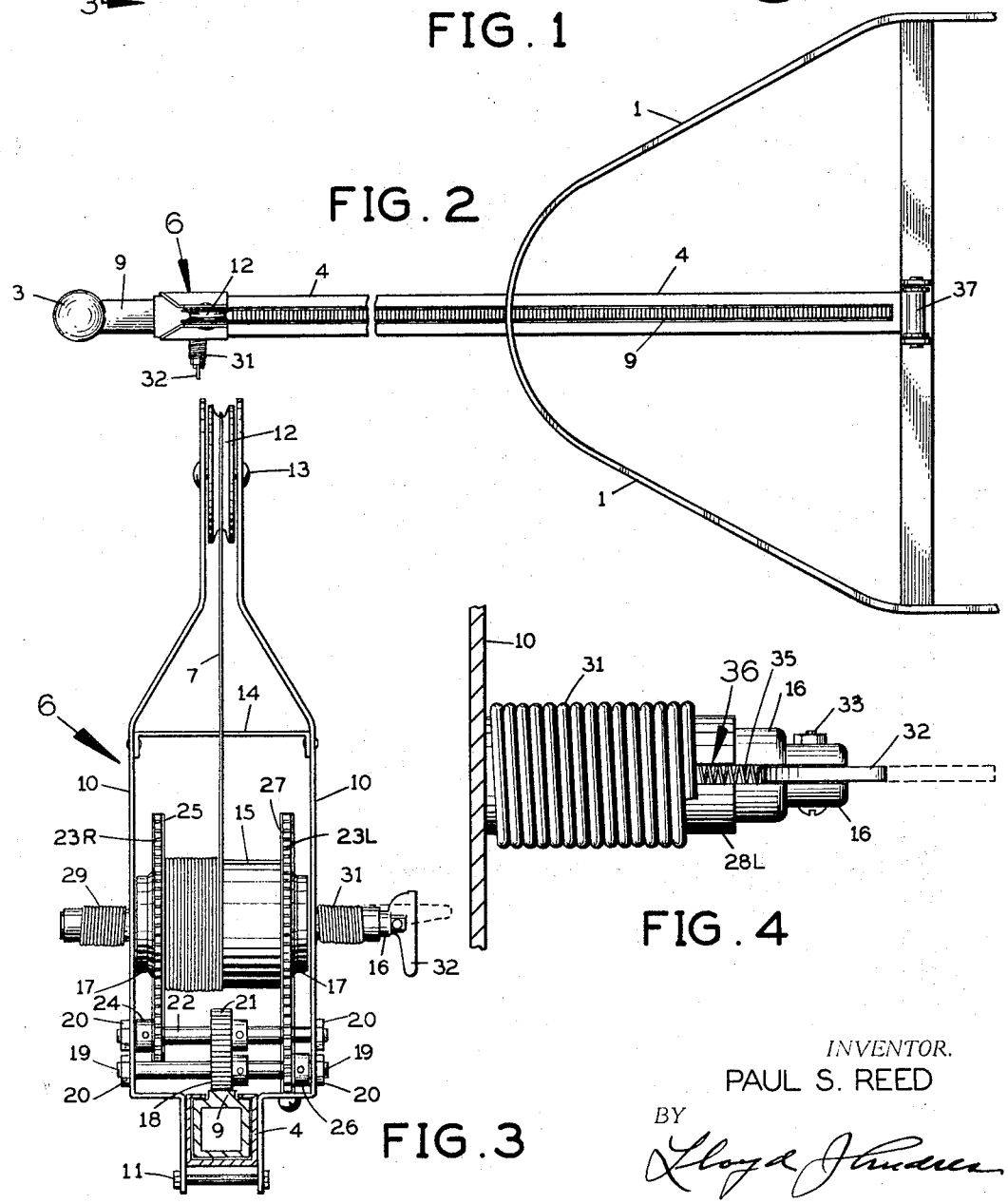
INVENTOR.
PAUL S. REED
BY
Lloyd Johnson June 20, 1967   P. S. REED   3,326,398
BOAT LOADER FOR TRAILERS
Filed Sept. 28, 1965   4 Sheets-Sheet 2
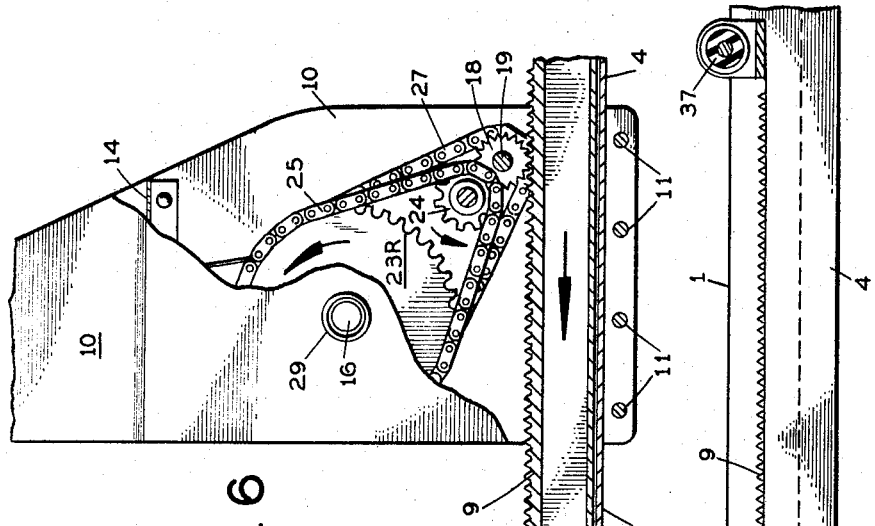
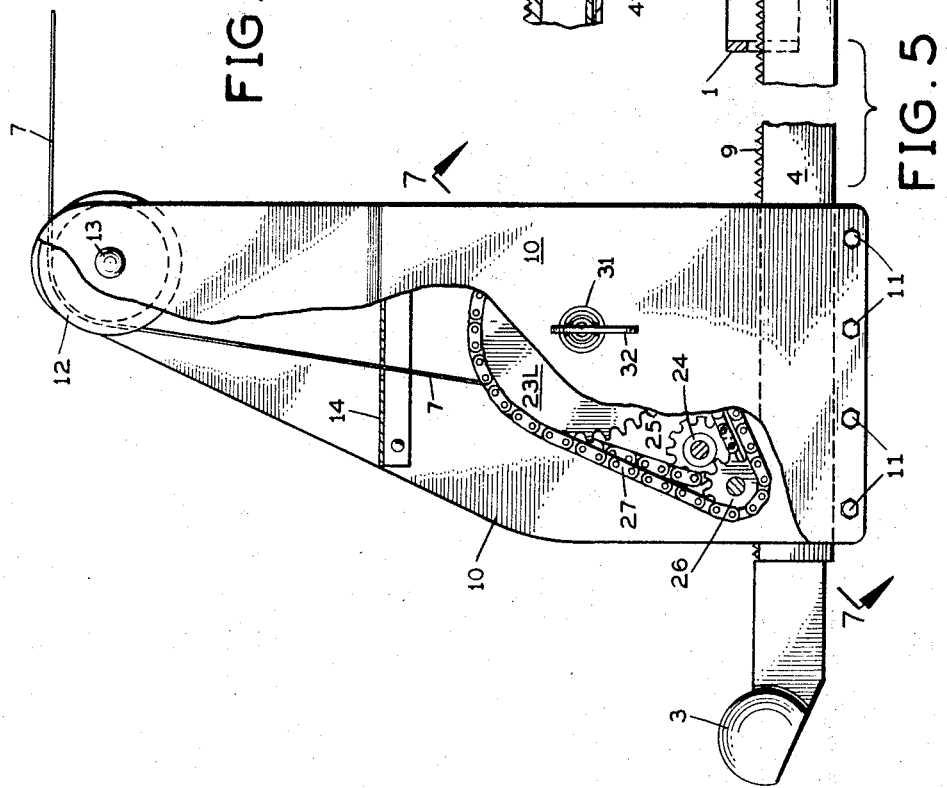
INVENTOR.
PAUL S. REED
BY
*Lloyd J. Andres*

June 20, 1967  P. S. REED  3,326,398
BOAT LOADER FOR TRAILERS

Filed Sept. 28, 1965  4 Sheets-Sheet 3

INVENTOR.
PAUL S. REED
BY
*Lloyd J. Andres*

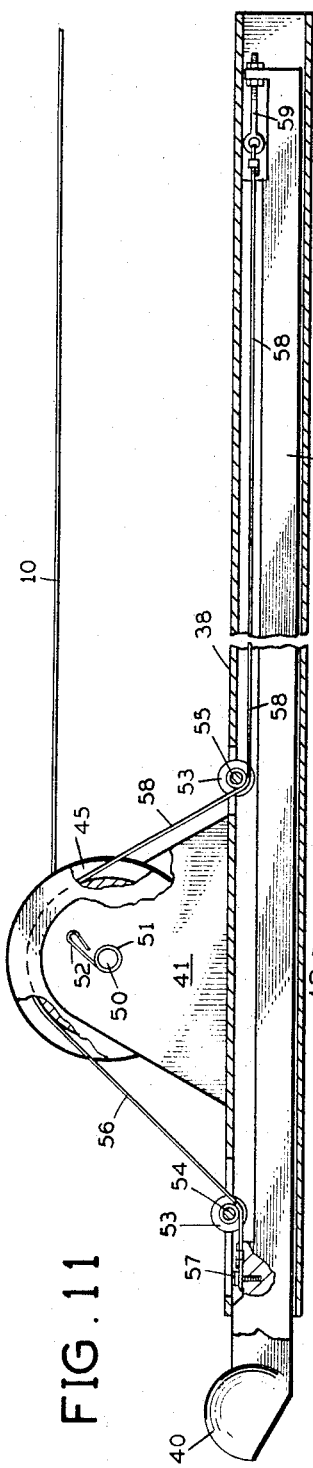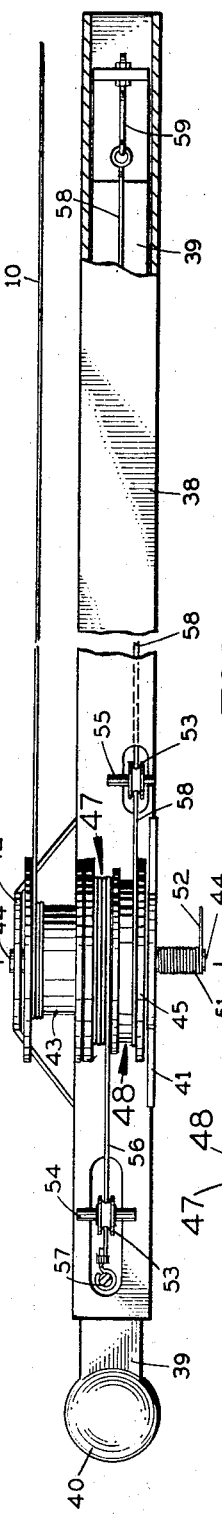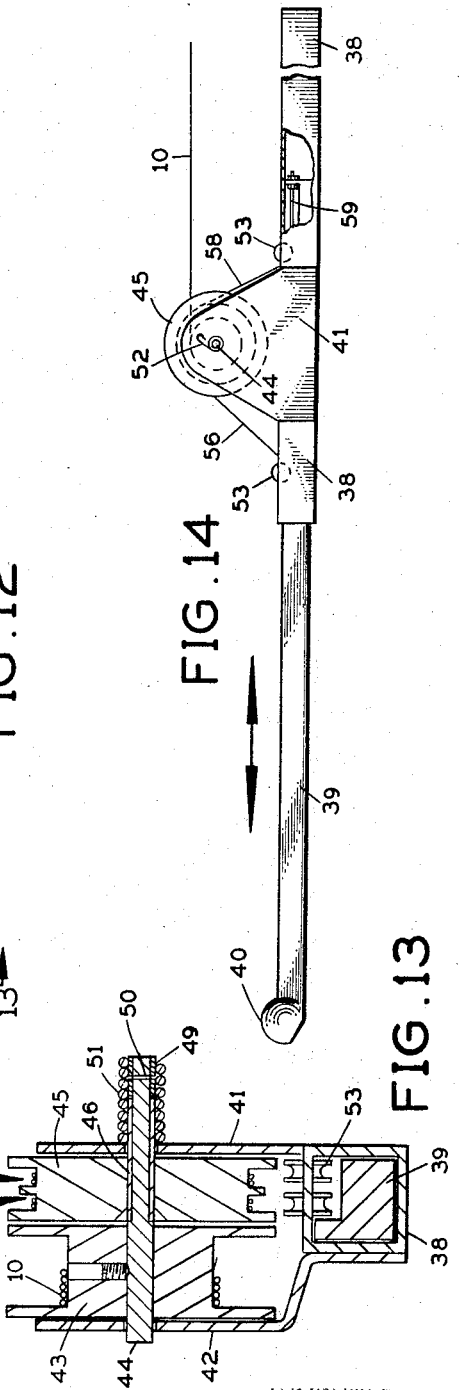

United States Patent Office 3,326,398
Patented June 20, 1967

3,326,398
BOAT LOADER FOR TRAILERS
Paul S. Reed, 610 NW. 187th St.,
North Miami, Fla. 33161
Filed Sept. 28, 1965, Ser. No. 490,886
6 Claims. (Cl. 214—517)

This invention relates in general to trailers for transporting boats by conventional automobiles and more particularly to a boat trailer having mechanism whereby predetermined fore and after movement of the automobile will withdraw a boat from flotation on the water onto the trailer for transport.

Trailers prior to this invention were normally equipped with manual winch means for withdrawing a cable attached to the boat and pulling the latter in transport position thereon. In many cases this was not only laborious but dangerous during rough breakers at the shoreline. Electric winches for this purpose have been used utilizing the electric power from the automobile battery as a source of energy for many years, which means often fails when the electric components are wet and are generally expensive to manufacture and maintain.

The present invention overcomes the above objections and disadvantages by the provision of a trailer incorporating a mechanical means whereby a short fore and aft motion of the automobile energizes a draw-bar mechanism for sequentially imparting rotation to a winch for withdrawing the boat by cable from surf onto the trailer for transport, which feature is a principal object of the invention.

A further object of the invention is the provision of a sequential clutch driven winch on a trailer operated by a transmission with the latter responsive to a short predetermined fore and aft movement of the automobile when hitched to the trailer.

A further object of the invention is the provision of a clutch operated winch for sequentially withdrawing a cable to load a boat upon a trailer by the sequential rotation of the winch and a transmission for operating same by the fore and aft movement of the auto to which the trailer is hitched including a clutch release mechanism for permitting the free rotation of the winch for launching a boat from the trailer by gravity into the surf.

These and other objects and advantages in two embodiments of the invention are described and shown in the attached specification and drawings, in which:

FIG. 1 is a side view of the trailer illustrating a boat resting thereon for transport in reduced scale.

FIG. 2 is a fragmentary plan view of the draw-bar end of the trailer shown in FIG. 1.

FIG. 3 is an enlarged front elevation of the switch mechanism taken through section line 3—3, FIG. 1.

FIG. 4 is a fragmentary plan view of elements of the winch shown in FIG. 3.

FIG. 5 is a fragmentary left side elevation of the winch shown in FIG. 3.

FIG. 6 is a fragmentary right hand cross sectional elevation of the winch shown in FIG. 5.

FIG. 11 is a fragmentary side cross sectional elevation of a form of a winch alternate to that shown in FIG. 5.

FIG. 12 is a fragmentary plan view of the winch shown in FIG. 11.

FIG. 13 is a cross sectional end view taken through section line 13—13, FIG. 12.

FIG. 14 is a side elevation of the alternate winch illustrating the operation thereof.

Figure 7:
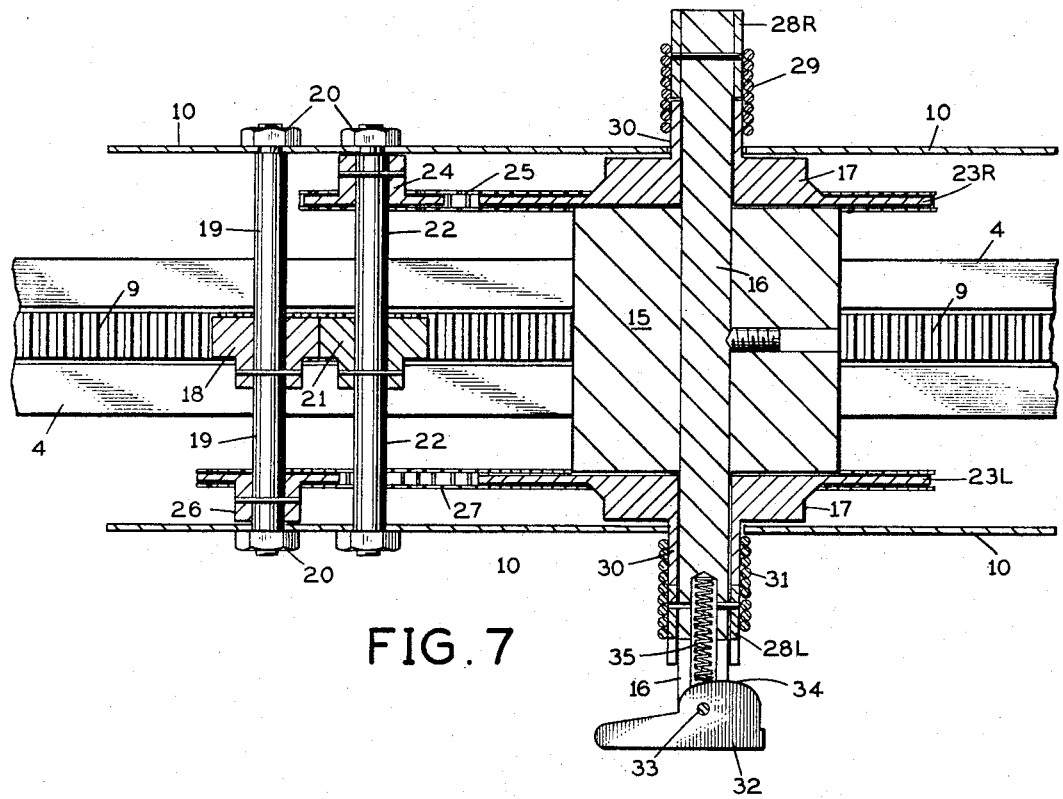
FIG. 7 is a cross sectional oblique view taken through section line 7—7, FIG. 5.

FIG. 1 shows a typical trailer having a chassis 1 and supported by a pair of wheels 2—2 with a conventional hitch means 3 in the forward end of the hollow rectangular draw-bar 4. A boat 5, illustrated in dotted lines, is positioned on the trailer for transport on conventional supports, not shown. A winch assembly 6 is secured to the fixed draw-bar 4 which carries a cable 7 normally secured to an eye bolt 8 in the bow of the boat.

Referring to FIGS. 2 and 3, a movable draw-bar member 9 is slidably positioned within draw-bar 4 for reciprocating movement therein, with the rack gear teeth thereon projecting upward through a linear slot in the draw-bar 4.

The frame of the winch 6 comprises a pair of side plates 10 secured in the lower ends thereof to the draw-bar 4 by bolts 11, better shown in FIG. 5. The upper ends of plates 10 are formed into parallel relation for retaining a pulley 12 journalled on a transverse stud 13, as shown, with the plates reinforced by a cross member 14. A drum 15 is supported for rotation between plates 10 by a coaxial shaft 16 which is journalled in coaxial clutch members 17 which in turn are journalled in plates 12. The inner end of cable 7 is secured to drum 15 and wound thereon and passed over pulley 12 for engaging an eye bolt 8 on the boat.

Referring to FIGS. 3, 4, 5, and 6, the transmission for sequentially rotating the drum 15 is retained within plates 10 and operated by rack teeth on draw-bar member 9. A forward pinion 18 meshed with the rack teeth is secured to a shaft 19 journalled in opposite sides of plates 10 and retained for rotation by hex nuts 20. A reverse pinion 21 is meshed with forward pinion 18 and secured to a shaft 22, parallel shaft 19, also journalled for rotation in plates 10 by nuts 20, better shown in FIG. 7. The right and left clutch members 17, also shown in FIG. 7, are free to rotate on shaft 16 and their outer peripheries terminate in chain sprocket 23R and 23L. A drive sprocket 24 is secured to shaft 22 and coupled to sprocket 23R by a chain 25. Another drive sprocket 26 is secured to shaft 19 and coupled to sprocket 23L by a chain 27.

It is now apparent that when the draw-bar rack 9 is moved outward in a co-linear direction in draw-bar 4 the clutch members 17—17 will rotate in opposite directions.

Again referring to FIG. 7, drum shaft 16 has sleeves 28L and 28R secured to opposite sides thereof and a left hand coil spring 29 is tensioned around sleeve 28R and over integral collar 30 of left clutch member 17, as shown. A right hand coil spring 31 is tensioned around sleeve 28L and collar 30 of left clutch member 17.

Referring to FIG. 6, and when the draw-bar rack 9 is moved inward in the direction shown by arrow in draw-bar 4 then sprocket 24 will rotate in a counter-clockwise direction as will sprocket 23R and thus tighten and secure coil spring 29 about sleeve 28R and extension 30 and rotate drum 15 to wind cable 7 thereon. Simultaneously the right hand spring 31 will be loosened on extension 30 and sleeve 28L and thus permit clutch member 17 to counter rotate free of drum 15.

When the draw-bar rack 9 is moved in opposite direction in draw-bar 4 spring 29 because of the counter rotation of clutch member 17 and the right hand spring 31 will be tightened on extension 30 and sleeve 28L and rotate the drum 15 in the same direction as previously rotated and thus further wind the cable 7 thereon.

It is now apparent that the cable will be segmentally and sequentially wound around drum 15 for each fore and aft movement of the automobile.

In order to lock the drum at any given position, particularly when the boat is loaded on the trailer, and referring to FIGS. 4 and 7, a toggle lever 32 is pivotally secured in a slot in the end of shaft 16 by a bolt 33 with a cam surface 34 in lever 32 positioned to engage a spring 35 in a coaxial bore in shaft 16. A slot 36 in sleeve 28L is provided to be engaged by toggle lever 32 when moved to the dotted position as shown in FIG. 3 thus disabling the clutch action of spring 31 and locking the drum 15 against rotation.

Figure 8:
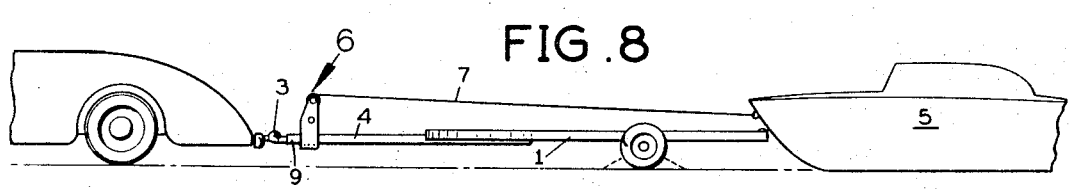
FIG. 8 illustrates the position of the trailer with reference to the automobile and boat before the loading of the latter.
Figure 9:
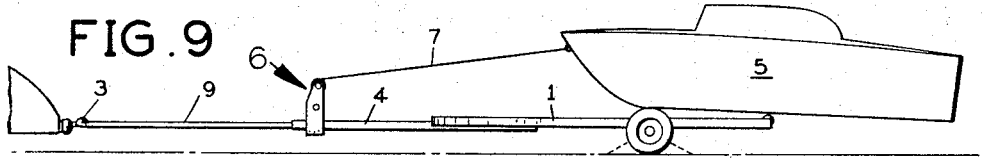
FIG. 9 illustrates the position of the trailer with respect to the automobile and the boat partially loaded on the trailer.
Figure 10:
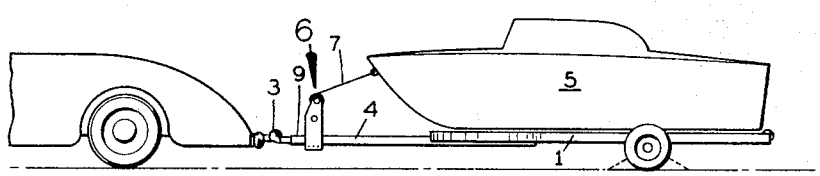
FIG. 10 illustrates the final position of the trailer with reference to the automobile and boat when the latter is fully loaded.

It is now apparent that when the spherical hitch 3 is secured to an automobile and the trailer positioned at the shoreline with the outer end of cable 7 secured to the boat, as shown in FIG. 8, then when the automobile is driven fore and aft a predetermined short distance the rack 9 will be reciprocated and the bow of the boat drawn into contact with the guide roller on the rear of the chassis of the trailer and the continued oscillation of the automobile will bring the boat through positions shown in FIGS. 9 and 10, and loaded on the trailer for transport with the forward portion of the keel in roller 37, shown in FIG. 2.

It is understood that brake means or chocks are applied to the wheels of the trailer to prevent motion thereof during the fore and aft movement of the automobile.

An alternate construction shown in FIGS. 11, 12, 13, and 14 is less expensive to manufacture than the aforesaid embodiment but utilizes only the forward movement of the automobile for loading.

The side elevation of the device shows a fixed hollow draw-bar 38 secured to the trailer frame in which a movable draw-bar 39 is retained for slidable movement therein with a conventional spherical hitch 40 at the outer end thereof. The alternate winch is supported between plates 41 and 42 secured to draw-bar 38. A drum 43 having a cable 10 wound thereon is secured to a shaft 44 which is supported by plates 41 and 42, better shown in FIG. 13. A drive pulley 45 is secured adjacent drum 43 on a sleeve 46 which is freely positioned for rotation about shaft 44 and through plate 41, as shown in FIG. 13. Pulley 45 has a pair of grooves 47 and 48 around the periphery thereof for retaining separate cables for rotating same in opposite directions. The left hand end of shaft 44 has a sleeve 49 secured thereon by a pin 50 and a coil spring 51 is tensioned about the sleeves 46 and sleeve 49, as shown, and terminates in a loop extension 52, as shown in FIGS. 11 and 12.

Referring to FIGS. 11 and 12, a forward guide pulley 53 is secured by an axle 54 on draw-bar 39, as shown. A like rear guide pulley 53 is secured on axle 55 on draw bar 39 with an adequate clearance aperture surrounding each guide pulley, as shown. A forward cable 56 is secured in groove 47 of pulley 45 and passes under pulley 53 with the opposite end thereof anchored to member 39 by a screw 57, as shown. A rear cable 58 is secured in groove 48 in pulley 45 and is guided by pulley 53 and anchored to member 39 by an adjustable screw eye 59.

In operation the withdrawal of the boat following the attachment of cable 10 is made by driving the automobile back and forth a predetermined distance with hitch 40 attached thereto which will alternately rotate pulley 45 in opposite directions and by virtue of the clutch action of coil spring 51 drum 43 will be rotated sequentially in a counter-clockwise direction as viewed in FIG. 11 and thus wind cable 10 thereon and draw the boat onto the trailer into position for transport with the drum and cable prevented from counter movement by the action of the clutch spring 51.

When the boat is to be launched from the trailer the loop extension 52 of coil spring 51 is manually rotated through a small angle, thus freeing the drum 43 for counter-rotation by the gravitation of the boat from the trailer.

It is understood that certain other modifications in the construction, utilizing the features above described, are intended to come within the scope of the appended claims.

Having described my invention, I claim:

1. A vehicle drawn trailer for loading and transporting a boat comprising a means forming a frame,
   a hollow fixed draw-bar secured to the front of said frame in longitudinal relation thereto,
   a movable draw-bar member having rack gear teeth on one side thereof positioned in said fixed draw-bar for axial reciprocation therein through a predetermined distance,
   a hitch means on the outer end of said movable draw-bar attached to said vehicle,
   a drum means journalled for rotation on said fixed draw-bar including a cable wound thereon with the outer end thereof adapted to be secured to the bow of a boat,
   a self-engaging clutch means operatively connected to said drum means for rotating same and winding said cable thereon when segmentally rotated in one direction,
   a transmission means on said fixed draw-bar connecting said gear teeth with said clutch for sequentially rotating the latter in said one direction when said draw-bar is moved in one direction when reciprocated by said vehicle whereby the resultant sequential rotation of said drum means will segmentally wind said cable thereon and pull said boat onto said trailer.

2. The construction recited in claim 1 including a second self-engaging clutch means operatively connected to said drum means for rotating same and winding said cable thereon when segmentally rotated in said one direction,
   a second transmission means on said fixed draw-bar connected with said first mentioned transmission means for sequentially rotating the latter in a direction opposite said one direction when said draw-bar is moved in a direction opposite said first mentioned one direction when reciprocated by said vehicle whereby said drum will rotate segmentally in the same direction for each fore and aft movement of said vehicle for winding said cable on said drum and pull said boat onto said trailer.

3. A vehicle drawn trailer for loading and transporting a boat comprising means forming a frame,
   a telescopic draw-bar means secured to the front of said frame,
   said draw-bar means having a first member fixed to the front end of said frame extending longitudinally therewith and a second member slidably secured for movement to and from said first member from a retracted to an extended position including a hitch means on the outer end thereof attached to said vehicle,
   a drum means journalled for rotation on said first draw-bar means having a cable wound thereon with the outer end thereof secured to the bow of the boat,
   a transmission means on said first member connected to said second member for rotation thereby in opposite directions when said second member is moved from said retracted to said extended position and vice versa,
   a self-engaging clutch means connecting said transmission to said drum means for engagement when said transmission is rotated in one direction for rotating said drum and loading said boat onto said trailer when said cable is connected thereto.

4. A winch means for a boat trailer comprising means forming a trailer frame,
   a draw-bar slidably secured at the front of said frame for predetermined longitudinal movement therewith from a retracted to an extended position including a hitch means on the outer end thereof for engagement with a vehicle, said draw-bar including a rack gear thereon, a winch drum journalled for rotation on said frame about an axis transverse thereof including a cable wound thereon with the outer end thereof adapted to be secured to the bow of a boat, a self-engaging clutch means having a driven member positioned coaxial with the said drum and connected to said drum for rotating same in one direction when segmentally driven, gear means connecting said driven clutch means with said rack gear whereby the movement of said draw-bar from said retracted to said extended position will rotate and engage said clutch means and said drum for winding said cable thereon.

5. The construction recited in claim 4 wherein said clutch means comprises a coaxial sleeve on said drum with a like sleeve positioned adjacent and coaxial therewith connected with said driven member, a coil spring tensioned around both said sleeves whereby said spring will engage both said sleeves when said driven member is rotated in one direction for rotating said drum.

6. A winch means for a boat trailer comprising means forming a trailer frame, a draw-bar slidably secured at the front of said frame for predetermined longitudinal movement therewith from a retracted to an extended position including a hitch means on the outer end thereof for engagement with a vehicle for reciprocation thereby, a winch drum journalled for rotation on said frame about an axis transverse thereof including a first cable wound thereon with the outer end thereof adapted to be secured to the bow of a boat, a pulley journalled for rotation in said frame about said axis and positioned adjacent said drum, a self-engaging clutch means connecting said pulley with said drum for sequentially rotating the latter in one direction when said pulley is rotated in said one direction with said pulley free for movement in opposite direction, a second cable secured to and encircling said pulley with each end thereof secured to said draw-bar a predetermined distance from said axis respectively whereby the reciprocation of said draw-bar by said vehicle will rotate said pulley in corresponding opposite directions and segmentally rotate said drum in said one direction and wind said first mentioned cable thereon.

No references cited.

GERALD M. FORLENZA, *Primary Examiner.*

A. J. MAKAY, *Assistant Examiner.*